United States Patent
Kaneda et al.

(10) Patent No.: US 9,871,613 B2
(45) Date of Patent: Jan. 16, 2018

(54) SUB-WAVELENGTH GRANULARITY FOR TRANSPORT OF MULTICARRIER OPTICAL SIGNALS

(71) Applicant: Alcatel-Lucent USA Inc., Murray Hill, NJ (US)

(72) Inventors: Noriaki Kaneda, Westfield, NJ (US); Sian Chong J. Lee, Summit, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/070,682

(22) Filed: Mar. 15, 2016

(65) Prior Publication Data

US 2017/0272195 A1   Sep. 21, 2017

(51) Int. Cl.
- H04Q 11/00   (2006.01)
- H04B 10/11   (2013.01)
- H04J 14/02   (2006.01)
- H04L 27/26   (2006.01)

(52) U.S. Cl.
CPC ...... H04J 14/0202 (2013.01); H04L 27/2601 (2013.01)

(58) Field of Classification Search
None
See application file for complete search history.

(56) References Cited

U.S. PATENT DOCUMENTS

| | | | |
|---|---|---|---|
| 6,529,303 B1 * | 3/2003 | Rowan | B82Y 15/00 370/480 |
| 7,130,356 B2 * | 10/2006 | Kaku | H04L 1/0071 375/295 |
| 7,400,609 B2 | 7/2008 | Hammerschmidt | |
| 8,515,286 B2 | 8/2013 | Liu et al. | |
| 8,611,743 B2 * | 12/2013 | Ji | H04J 14/0212 398/45 |
| 8,660,433 B2 | 2/2014 | Liu et al. | |
| 8,787,762 B2 * | 7/2014 | Ji | H04J 14/0212 398/79 |
| 8,891,352 B2 * | 11/2014 | Zou | H04L 5/0007 370/208 |

(Continued)

OTHER PUBLICATIONS

Qi Yang, et al., "Chapter 2: Optical OFDM Basics," from the book "Impact of 15 Nonlinearities on Fiber Optic Communications," published by Springer, 2011 (44 pages).

(Continued)

*Primary Examiner* — Oommen Jacob
(74) *Attorney, Agent, or Firm* — Mendelsohn Dunleavy, P.C.; Yuri Gruzdkov

(57) ABSTRACT

We disclose an optical add-drop multiplexer that can apply different routing operations to different subcarriers of a data frame. In an example embodiment, the digital signal processor (DSP) of the optical add-drop multiplexer carries out subcarrier-specific add, drop, and pass-through operations in the electrical frequency domain, which enables the DSP to only partially unwrap the pass-through subcarriers, thereby at least partially avoiding some of the more processing-power-hungry DSP operations and reducing the sub-wavelength routing latency accordingly. Also disclosed is an example data-frame structure that can be used to provide subcarrier-specific routing instructions to the optical add-drop multiplexer.

17 Claims, 8 Drawing Sheets

(56) References Cited

U.S. PATENT DOCUMENTS

| | | | |
|---|---|---|---|
| 9,112,608 B2* | 8/2015 | Bai | |
| 9,379,820 B2* | 6/2016 | Huang | H04B 10/60 |
| 2007/0009061 A1* | 1/2007 | Kaku | H04L 1/0071 |
| | | | 375/295 |
| 2009/0092389 A1* | 4/2009 | Wei | H04J 14/0241 |
| | | | 398/59 |
| 2012/0176990 A1* | 7/2012 | Zou | H04L 5/0007 |
| | | | 370/329 |
| 2012/0213523 A1* | 8/2012 | Ji | H04J 14/0212 |
| | | | 398/83 |
| 2012/0230693 A1* | 9/2012 | Zou | H04B 10/272 |
| | | | 398/66 |
| 2013/0148963 A1* | 6/2013 | Cvijetic | H04J 14/04 |
| | | | 398/45 |
| 2013/0195452 A1* | 8/2013 | Hui | H04J 14/022 |
| | | | 398/50 |
| 2014/0153928 A1* | 6/2014 | Yu | H04B 10/1129 |
| | | | 398/115 |
| 2014/0198812 A1* | 7/2014 | Olsson | H04J 14/0202 |
| | | | 370/542 |
| 2015/0181316 A1* | 6/2015 | Patel | H04Q 11/0005 |
| | | | 398/45 |

OTHER PUBLICATIONS

Metro Ethernet Forum, Technical Specification, "Carrier Ethernet Network Architecture Framework Part 2: Ethernet Services Layer," Technical Specification MEF 12.2, 2014, pp. 1-60.

Dominique Chiaroni, et al., "Packet OADMs for the Next Generation of Ring Networks," Bell Labs Tech. J., 2010, vol. 14, No. 4, pp. 265-283.

* cited by examiner

100

400

600

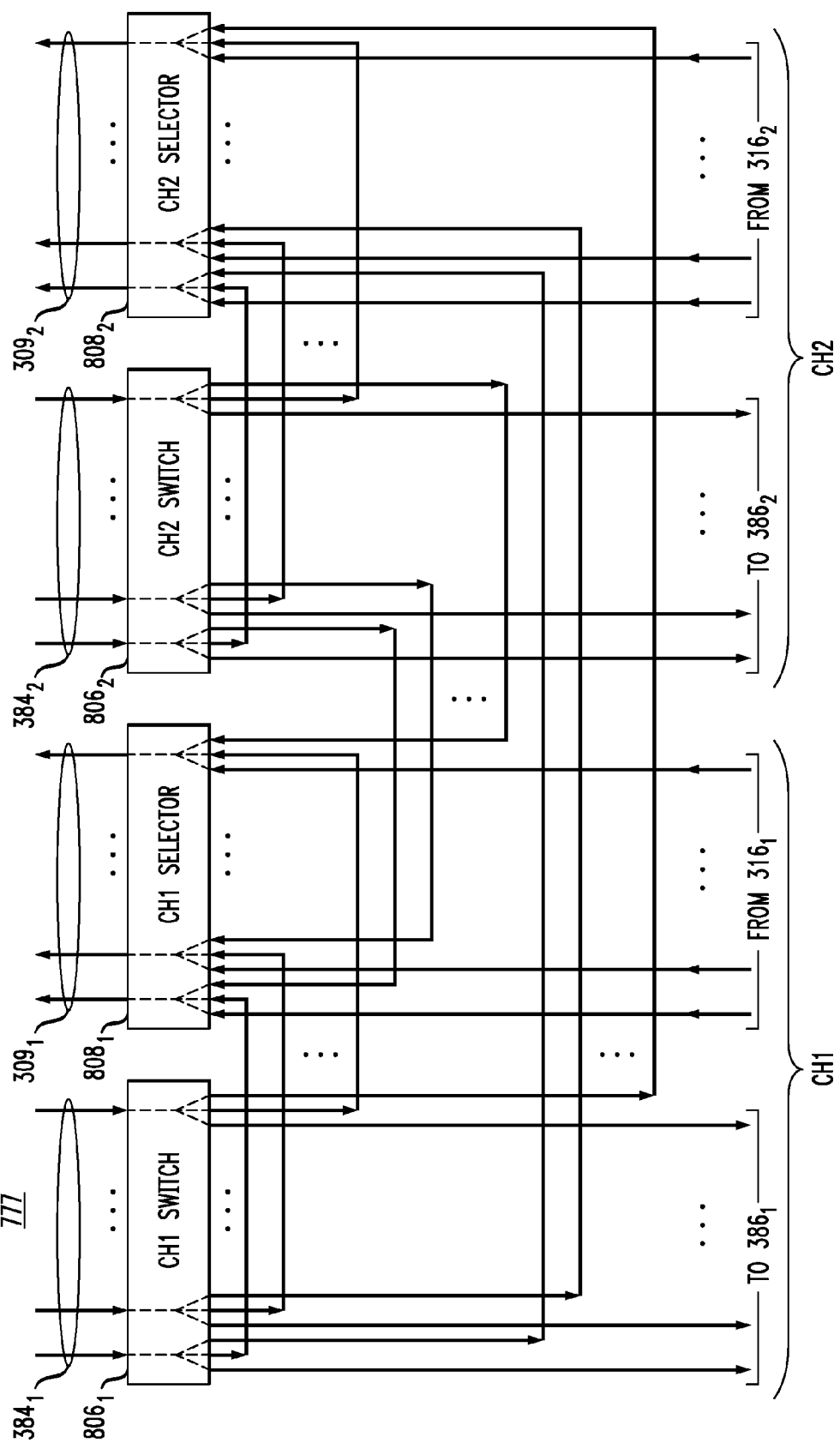

SUB-WAVELENGTH GRANULARITY FOR TRANSPORT OF MULTICARRIER OPTICAL SIGNALS

BACKGROUND

Field

The present disclosure relates to optical communication equipment and, more specifically but not exclusively, to sub-wavelength granularity for transport of multicarrier optical signals, e.g., optical orthogonal frequency-division multiplexed (OFDM) signals.

Description of the Related Art

This section introduces aspects that may help facilitate a better understanding of the disclosure. Accordingly, the statements of this section are to be read in this light and are not to be understood as admissions about what is in the prior art or what is not in the prior art.

Orthogonal frequency-division multiplexing (OFDM) is a multicarrier transmission technique in which data are transmitted using a plurality of mutually orthogonal subcarriers. In optical transport systems, OFDM has received increased attention as a means to overcome certain shortcomings of single-carrier and/or wavelength-division-multiplexing (WDM) optical transport systems. For example, coherent optical OFDM (CO-OFDM) is viewed as beneficially combining the important advantages of both coherent detection and OFDM modulation. In a conventional physical-layer implementation of CO-OFDM, the transmitter up-shifts the baseband OFDM signal to optical frequencies using an optical I/Q modulator that modulates a carrier wavelength generated by the transmitter's laser, and the receiver down-shifts the corresponding received optical OFDM signal to baseband using the receiver's optical local oscillator. Conventional CO-OFDM transport is typically implemented with undivided wavelength granularity, according to which all OFDM subcarriers corresponding to the carrier wavelength are handled together.

SUMMARY OF SOME SPECIFIC EMBODIMENTS

Disclosed herein are various embodiments of an optical add-drop multiplexer that can apply different routing operations to different subcarriers of a data frame. In an example embodiment, the digital signal processor (DSP) of the optical add-drop multiplexer carries out subcarrier-specific add, drop, and pass-through operations in the electrical frequency domain, which enables the DSP to only partially unwrap the pass-through subcarriers, thereby at least partially avoiding some of the more processing-power-hungry DSP operations and reducing the sub-wavelength routing latency accordingly. Also disclosed is an example data-frame structure that can be used to provide subcarrier-specific routing instructions to the optical add-drop multiplexer.

According to one embodiment, provided is an apparatus comprising an optical add-drop multiplexer configured to receive a first optical signal and to generate a second optical signal, each of the first and second optical signals being an optical OFDM signal, wherein the optical add-drop multiplexer comprises a first receiver branch and a first transmitter branch. The first receiver branch is configured to: apply a Fourier-transform operation to a first digital time-domain signal corresponding to the first optical signal to generate a first set of digital spectral components, each corresponding to a respective OFDM subcarrier; transfer a first subset of the first set of digital spectral components to the first transmitter branch; and process a second subset of the first set of digital spectral components to generate a first output data stream that carries data encoded in the second subset of the first set of digital spectral components. The first transmitter branch is configured to apply an inverse Fourier-transform operation to a second set of digital spectral components, each corresponding to a respective OFDM subcarrier, to generate a second digital time-domain signal, wherein the second set of digital spectral components includes the first subset of the first set of digital spectral components received from the first receiver branch. The optical add-drop multiplexer is further configured to use the second digital time-domain signal to generate the second optical signal in a manner that causes the second optical signal to carry data encoded in the first subset of the first set of digital spectral components.

According to another embodiment, provided is an apparatus comprising an optical add-drop multiplexer configured to receive a first optical signal and to generate a second optical signal, each of the first and second optical signals being an optical OFDM signal, wherein the optical add-drop multiplexer comprises a first receiver branch and a first transmitter branch. The first receiver branch is configured to: apply a Fourier-transform operation to a first digital time-domain signal corresponding to the first optical signal to generate a first set of digital spectral components, each corresponding to a respective OFDM subcarrier; and transfer a first subset of the first set of digital spectral components to the first transmitter branch. The first transmitter branch is configured to: receive a first input data stream; generate a second subset of digital spectral components having encoded thereon data carried by the first input data stream; and apply an inverse Fourier-transform operation to a second set of digital spectral components, each corresponding to a respective OFDM subcarrier, to generate a second digital time-domain signal, wherein the second set of digital spectral components includes the first subset of the first set of digital spectral components received from the first receiver branch and the second subset of digital spectral components. The optical add-drop multiplexer is further configured to use the second digital time-domain signal to generate the second optical signal in a manner that causes the second optical signal to carry data encoded in the first subset of the first set of digital spectral components and in the second subset of digital spectral components.

According to yet another embodiment, provided is a communication method comprising: handling an optical signal having encoded thereon a data frame that comprises a header and a payload; wherein the payload includes a plurality of OFDM subcarriers modulated with data; and wherein the header includes one or more add-drop-through (ADT) indices, each ADT index corresponding to a respective one of the OFDM subcarriers or a respective set of the OFDM subcarriers and encoding a respective instruction that specifies a routing operation to be applied by an optical add-drop multiplexer to the respective one of the OFDM subcarriers or the respective set of the OFDM subcarriers, the routing operation comprising one or more of dropping, passing through, and adding the respective one of the OFDM subcarriers or the respective set of the OFDM subcarriers.

According to yet another embodiment, provided is an apparatus comprising: two or more sub-wavelength add-drop multiplexers (SWADMs) optically connected to one another in a ring; and means for causing an optical OFDM signal to circulate through the ring. Each of the two or more SWADMs is configured to modify the optical OFDM signal by causing a previously vacant subcarrier thereof to carry data, with the optical OFDM signal modifications being performed while the optical OFDM signal is circulating through the ring.

According to yet another embodiment, provided is an apparatus comprising: a first electro-optical channel configured to (i) receive a first optical OFDM signal and (ii) generate a second optical OFDM signal; a second electro-optical channel configured to (i) receive a third optical OFDM signal and (ii) generate a fourth optical OFDM signal; and an electronic subcarrier router that connects the first electro-optical channel and the second electro-optical channel in a manner that enables the apparatus to perform one or more of the following operations: cause a data set carried by a subcarrier of the first optical OFDM signal to be (i) dropped into a respective tributary data stream; (ii) transferred to be carried by a corresponding subcarrier of the second optical OFDM signal; and/or (iii) transferred to be carried by a corresponding subcarrier of the fourth optical OFDM signal; and cause a data set carried by a subcarrier of the third optical OFDM signal to be (i) dropped into a respective tributary data stream; (ii) transferred to be carried by a corresponding subcarrier of the second optical OFDM signal; and/or (iii) transferred to be carried by a corresponding subcarrier of the fourth optical OFDM signal.

BRIEF DESCRIPTION OF THE DRAWINGS

Other aspects, features, and benefits of various disclosed embodiments will become more fully apparent, by way of example, from the following detailed description and the accompanying drawings, in which:

FIG. 8 shows a block diagram of a subcarrier router that can be used in the multichannel sub-wavelength add-drop multiplexer of FIG. 7 according to an embodiment.

DETAILED DESCRIPTION

Figure 1:
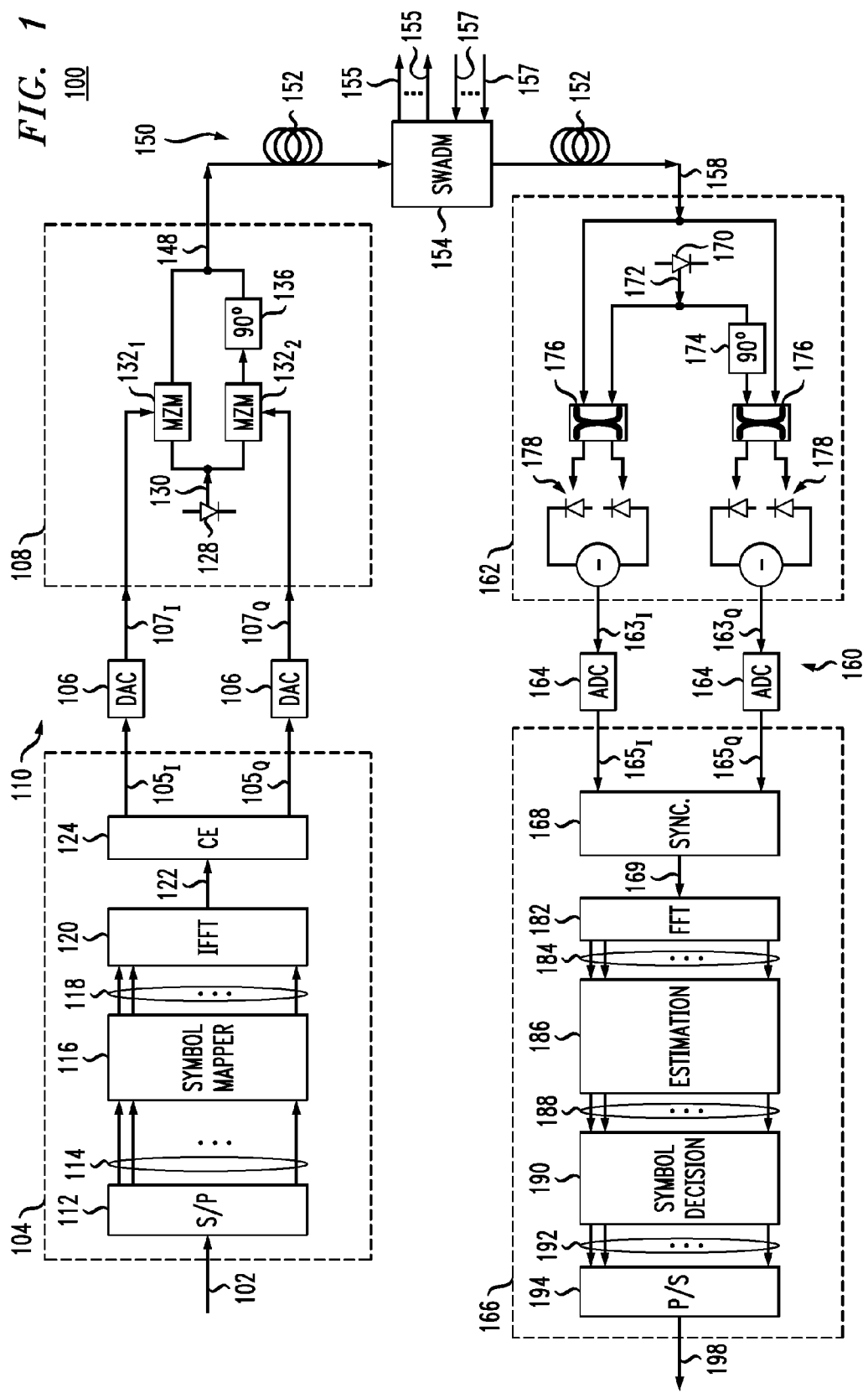
FIG. 1 shows a block diagram of an optical transport system according to an embodiment.

FIG. 1 shows a block diagram of an optical transport system 100 according to an embodiment. System 100 is a CO-OFDM transport system that comprises an optical OFDM transmitter 110 and an optical OFDM receiver 160 that are optically coupled to one another by way of a fiber-optic link 150. In an example embodiment, fiber-optic link 150 comprises a sub-wavelength add-drop multiplexer (SWADM) 154 coupled between the corresponding sections of optical fiber 152. In alternative embodiments, fiber-optic link 150 may have more than one instance of SWADM 154, each coupled between the two respective sections of optical fiber 152. Basic operations of transmitter 110, receiver 160, and SWADM 154 are described in more detailed below. Example embodiments of SWADM 154 are further described in reference to FIG. 3.

Transmitter 110 comprises a digital signal processor (DSP) 104, digital-to-analog converters (DACs) 106, and an electrical-to-optical (E/O) converter 108. DSP 104 operates to convert an input data stream 102 into a corresponding pair of digital electrical signals labeled in FIGS. 1 as $105_I$ and $105_Q$. Signal $105_I$ represents the in-phase (I) component of the baseband OFDM signal to be transmitted, and signal $105_Q$ similarly represents the quadrature (Q) component of that baseband OFDM signal. DACs 106 convert digital electrical signals $105_I$ and $105_Q$ into the corresponding analog electrical drive signals $107_I$ and $107_Q$, respectively. E/O converter 108 then uses signals $107_I$ and $107_Q$ to generate an optical OFDM signal 148 that is applied to fiber-optic link 150.

In an example embodiment, DSP 104 includes the following signal-processing circuits or sub-units: a serial-to-parallel (S/P) converter 112, a symbol mapper 116, an inverse fast-Fourier-transform (IFFT) circuit 120, and a cyclic-extension (CE) circuit 124. S/P converter 112 splits the input data stream 102 into multiple parallel sub-streams and also inserts data pilots. The resulting plurality of parallel data streams 114 is applied to symbol mapper 116.

In an example embodiment, the total number of parallel data streams 114 is equal to the total number of OFDM subcarriers, including the subcarriers used for data pilots. In some alternative embodiments, the total number of parallel data streams 114 can be smaller than the total number of OFDM subcarriers. In some other alternative embodiments, the total number of parallel data streams 114 can be greater than the total number of OFDM subcarriers.

In an example embodiment, symbol mapper 116 uses the operative constellation to convert each of parallel data streams 114 into a corresponding one of constellation symbols 118, with each constellation symbol being also mapped onto a respective OFDM subcarrier. In various embodiments, the operative constellation can be a phase-shift-keying (PSK) constellation, a quadrature-amplitude-modulation (QAM) constellation, or any other suitable constellation. IFFT circuit 120 applies an inverse Fourier-transform operation to subcarrier-mapped constellation symbols 118 to generate a corresponding digital time-domain signal 122. CE circuit 124 operates to add a cyclic extension to time-domain signal 122 and split a resulting extended digital time-domain signal into real and imaginary signal portions, thereby generating digital electrical signals $105_I$ and $105_Q$, respectively.

In alternative embodiments, additional signal-processing circuits or sub-units can be used in DSP 104, e.g., as known in the pertinent art. For example, an alternative embodiment of DSP 104 may include a pre-emphasis circuit (not explicitly shown in FIG. 1) configured to pre-compensate for (i) signal distortions caused by excess low-pass filtering, (ii) non-linear transfer functions of an optical I/Q modulator used in E/O converter 108, and/or (iii) chromatic dispersion in fiber-optic link 150.

In an example embodiment, E/O converter 108 includes a laser 128 and an optical I/Q modulator implemented using Mach-Zehnder modulators (MZMs) $132_1$ and $132_2$ and a phase shifter 136. Laser 128 provides a carrier wave 130 to MZMs $132_1$ and $132_2$ as indicated in FIG. 1. MZM $132_1$ modulates a first split portion of carrier wave 130 using analog electrical drive signal $107_I$, thereby generating an I-component of optical OFDM signal 148. MZM $132_2$ similarly modulates a second split portion of carrier wave 130 using analog electrical drive signal $107_2$. Phase shifter 136 then applies a fixed phase shift of about 90 degrees to a resulting modulated optical signal generated by MZM $132_2$ to generate a Q-component of optical OFDM signal 148. The I- and Q-components generated in this manner are then recombined, e.g., using a conventional optical power combiner, to generate optical OFDM signal 148.

Receiver 160 comprises an optical-to-electrical (O/E) converter 162, analog-to-digital converters (ADCs) 164, and a DSP 166. O/E converter 162 operates to convert a received optical OFDM signal 158 into analog electrical signals $163_I$ and $163_Q$. Note that optical OFDM signal 158 may differ from optical OFDM signal 148 due to the presence in fiber-optic link 150 of SWADM 154, the operation of which is described in more detail below. ADCs 164 operate to convert analog electrical signals $163_I$ and $163_Q$ into the corresponding digital electrical signals $165_I$ and $165_Q$, respectively. Signal $165_I$ represents the in-phase (I) component of optical OFDM signal 158 with respect to an optical local-oscillator signal 172 used in O/E converter 162, and signal $165_Q$ represents the quadrature (Q) component of that optical OFDM signal with respect to the optical local-oscillator signal. DSP 166 operates to process digital electrical signals $165_I$ and $165_Q$ to recover the payload data carried by optical OFDM signal 158. The recovered data are then directed to external circuits (not explicitly shown in FIG. 1) by way of an output data stream 198.

O/E converter 162 implements an intradyne-detection scheme using optical local-oscillator signal 172 generated by a laser 170. Optical beam splitters (not explicitly shown in FIG. 1) are used to split each of optical OFDM signal 158 and optical local-oscillator signal 172 into two respective split portions. A relative phase shift of about 90 degrees ($\pi/2$ radian) is applied to one split portion of signal 172 using a phase shifter 174. The various split portions of signals 172 and 158 generated in this manner are optically mixed with one another as indicated in FIG. 1 using two optical signal mixers 176. The mixed optical signals produced by optical signal mixers 176 are then detected by four photo-detectors (e.g., photodiodes) 178. Photo-detectors 178 are arranged in pairs, as shown in FIG. 1, and the electrical output of each photo-detector pair is a corresponding one of analog electrical signals $163_I$ and $163_Q$. This configuration of photo-detectors 178 is a differential configuration that helps to reduce noise and improve DC balancing. A person of ordinary skill in the pertinent art will understand that, in alternative embodiments, other photo-detector arrangements can also be used.

In an example embodiment, DSP 166 includes the following signal-processing circuits or sub-units: a symbol-and-frequency synchronization circuit 168, a fast-Fourier-transform (FFT) circuit 182, a channel-and-phase estimation circuit 186, a decision circuit 190, and a parallel-to-serial (P/S) converter 194. The symbol-and-frequency synchronization performed by circuit 168 is directed at (i) correctly locating the beginning and end of a received OFDM frame and/or each OFDM symbol contained therein and (ii) compensate for the usually present frequency offset between the carrier wavelength of optical OFDM signal 158 and optical local-oscillator signal 172. The output of circuit 168 is a complex-valued time-domain signal 169 that is partitioned into sections, each containing a corresponding OFDM symbol. FFT circuit 182 applies a Fourier-transform operation to each OFDM symbol to convert it into a corresponding set of digital spectral components 184. The channel-and-phase estimation performed by circuit 186 is directed at (i) estimating the channel transfer function corresponding to fiber-optic link 150 and (ii) estimating the phase noise typically present due to the non-negligible line-widths of the carrier wavelengths of optical OFDM signal 158 and optical local-oscillator signal 172. Circuit 186 then uses the estimated channel transfer function and estimated phase noise to apply appropriate corrections to digital spectral components 184, thereby transforming them into a corresponding set of corrected digital spectral components 188. Decision circuit 190 maps each of the corrected digital spectral components 188 onto the operative constellation, thereby generating a corresponding set of constellation symbols. Decision circuit 190 then decodes each constellation symbol to convert it into a corresponding data word, which is outputted by way of a respective one of parallel data streams 192. P/S converter 194 operates to remove the data streams 192 carrying the pilot data and to appropriately multiplex the data streams 192 carrying the payload data to generate output data stream 198.

A person of ordinary skill in the art will understand that the above-described operations of transmitter 110 and receiver 160 are performed with undivided wavelength granularity with respect to the carrier wavelength. For example, transmitter 110 functions as an optical-signal source that causes all payload data carried by the subcarriers of optical OFDM signal 148 to originate from input data stream 102. Similarly, receiver 160 functions as an optical-signal sink that causes all payload data carried by the subcarriers of optical OFDM signal 158 to be sunk into output data stream 198.

In contrast, SWADM 154 is designed to operate with sub-wavelength granularity, both in its capacity as an optical-signal source and in its capacity as an optical-signal sink. More specifically, SWADM 154 receives optical OFDM signal 148 from transmitter 110 and transmits optical OFDM signal 158 to receiver 160. In its capacity as a sub-wavelength sink, SWADM 154 processes optical OFDM signal 148 such that (i) payload data carried by a first subset of subcarriers of optical OFDM signal 148 are sunk locally into one or more tributary data streams 155 outputted by the SWADM and (ii) payload data carried by a second subset of subcarriers of optical OFDM signal 148 are transferred to the corresponding subcarriers of optical OFDM signal 158 and are transmitted to be sunk remotely, e.g., into output data stream 198 at receiver 160.

Similarly, in its capacity as a sub-wavelength source, SWADM 154 generates optical OFDM signal 158 such that (i) payload data carried by a first subset of subcarriers of optical OFDM signal 158 originate from one or more tributary data streams 157 received by the SWADM and (ii) payload data carried by a second subset of subcarriers of optical OFDM signal 158 are transferred thereto from the corresponding subcarriers of optical OFDM signal 148. In some configurations, the above-mentioned first subset of subcarriers of optical OFDM signal 148 may differ from the first subset of subcarriers of optical OFDM signal 158. In some configurations, the above-mentioned second subset of subcarriers of optical OFDM signal 148 may be the same as the second subset of subcarriers of optical OFDM signal 158. In an example embodiment, both the number and the selected frequencies of the subcarriers assigned to any or all of the above-mentioned subsets of subcarriers of OFDM signals 148 and 158 are controllable and can be dynamically changed, e.g., as further described below in reference to FIGS. 2-3.

In an example embodiment, the DSP (not explicitly shown in FIG. 1, see FIG. 3) of SWADM 154 carries out the above-described sub-wavelength add, drop, and pass-through operations in the electrical frequency domain, which enables this DSP to only partially unwrap the pass-through subcarriers, thereby at least partially avoiding some of the more processing-power-hungry DSP operations and reducing the routing latency accordingly. By some estimates, for the 10-Gb/s tributaries, possible reduction in routing latency with respect to the routing latency achieved using the corresponding conventional methods can be about 30 μs or more. A person of ordinary skill in the relevant art will appreciate that routing latency improvements of this magnitude may particularly be useful and important, e.g., for the backbone optical network configured to support wireless 5G applications in which distributed MIMO processing needs to be carried out with relatively low latency.

Figure 2:
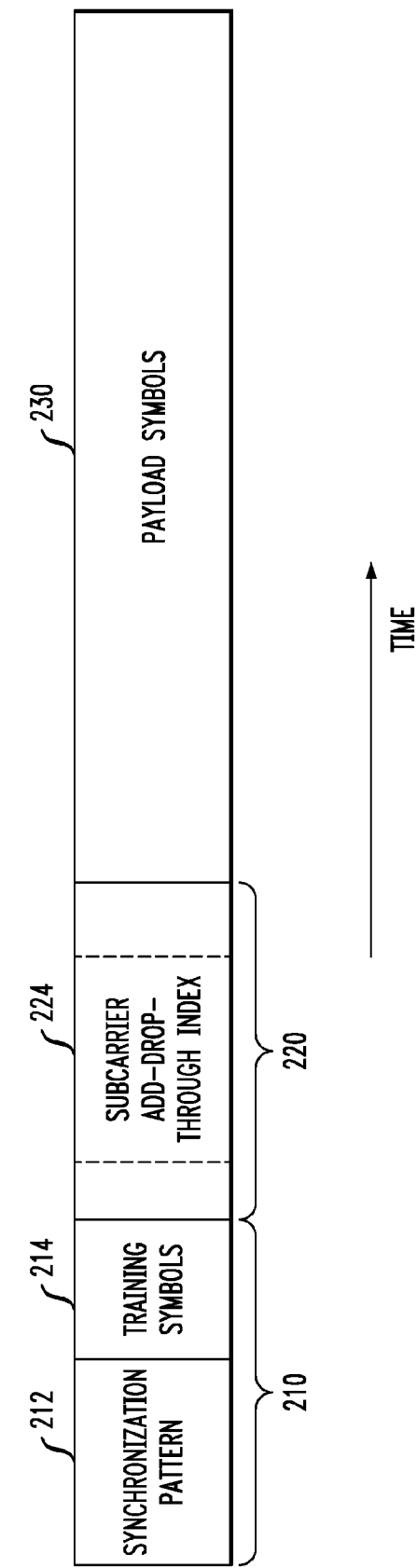
FIG. 2 schematically shows a data frame that can be used to generate of an optical OFDM signal in the optical transport system of FIG. 1 according to an embodiment.

FIG. 2 schematically shows a data frame 200 that can be carried by each of optical OFDM signals 148 and 158 (FIG. 1) according to an embodiment. In operation, each of optical OFDM signals 148 and 158 can be generated to carry a sequence of data frames 200. Note that only the time dimension of data frame 200 is shown in FIG. 2. The frequency dimension of data frame 200 can have a structure that is qualitatively similar to one of those disclosed, e.g., in (i) U.S. Pat. No. 7,400,609 and (ii) Qi Yang, Abdullah Al Amin, and William Shieh, "Chapter 2: Optical OFDM Basics," from the book "Impact of Nonlinearities on Fiber Optic Communications," published by Springer in 2011. Both of these publications are incorporated herein by reference in their entirety.

Data frame 200 comprises a preamble 210, a header 220, and a payload portion 230. Preamble 210 comprises portions 212 and 214. Portion 212 carries a synchronization pattern, on which synchronization circuit 168 (FIG. 1) can rely to perform the above-described synchronization. Portion 214 carries training symbols, on which estimation circuit 186 (FIG. 1) can rely to perform its above-described function.

Header 220 may include multiple fields, only one of which labeled 224 is explicitly shown in FIG. 2 for illustration purposes. Field 224 is configured to carry a plurality of add-drop-through (ADT) indices. In some embodiments, field 224 may carry a respective ADT index for each subcarrier allocated for payload-data transmission. In some other embodiments, field 224 may carry a respective ADT index for each subcarrier band allocated for payload-data transmission, with each such subcarrier band including two or more respective subcarriers. In an example embodiment, an ADT index is a two-bit value that can be interpreted by the corresponding circuitry of SWADM 154 (FIG. 1), e.g., as follows:
  (i) if the ADT index is "00," then the corresponding subcarrier or subcarrier band is passed through, e.g., transferred from optical OFDM signal 148 to optical OFDM signal 158;
  (ii) if the ADT index is "01," then the corresponding subcarrier or subcarrier band is dropped, e.g., not transferred from optical OFDM signal 148 to optical OFDM signal 158, with the corresponding data being sunk into a tributary data stream 155;
  (iii) if the ADT index is "10," then the corresponding subcarrier or subcarrier band is added, e.g., is not present in optical OFDM signal 148 but appears in optical OFDM signal 158;
  (iv) if the ADT index is "11," then the corresponding subcarrier or subcarrier band is replaced, e.g., dropped from optical OFDM signal 148 and the resulting spectral vacancy is filled in optical OFDM signal 158 to carry a different tributary data stream.

In alternative embodiments, other formats of ADT indices carried by field 224 are also possible.

For example, in some alternative embodiments, SWADM 154 can be configured to carry out a "duplication" procedure, using which the SWADM can simultaneously (i) pass an OFDM subcarrier or an OFDM-subcarrier band from optical OFDM signal 148 to optical OFDM signal 158 and (ii) sink a copy of the data stream(s) carried by an OFDM subcarrier or an OFDM-subcarrier band of optical OFDM signal 148 into one or more of tributary data streams 155. This particular feature can be used, e.g., to enable additional network functions, such as broadcasting.

The other fields (if any) of header 220 may carry information about the coding rate, modulation type, the length of payload portion 230 (e.g., if data frame 200 has a variable length), etc.

Payload portion 230 includes a plurality of OFDM symbols carrying payload data. In different embodiments, the number of OFDM symbols in payload portion 230 may be fixed or variable. If the number of OFDM symbols in payload portion 230 is variable, then header 220 may include a "length" field (not explicitly shown in FIG. 2) that specifies the number of OFDM symbols in the payload portion of the corresponding data frame 200. In an example embodiment, payload portion 230 may contain about 500 OFDM symbols.

Figure 3:
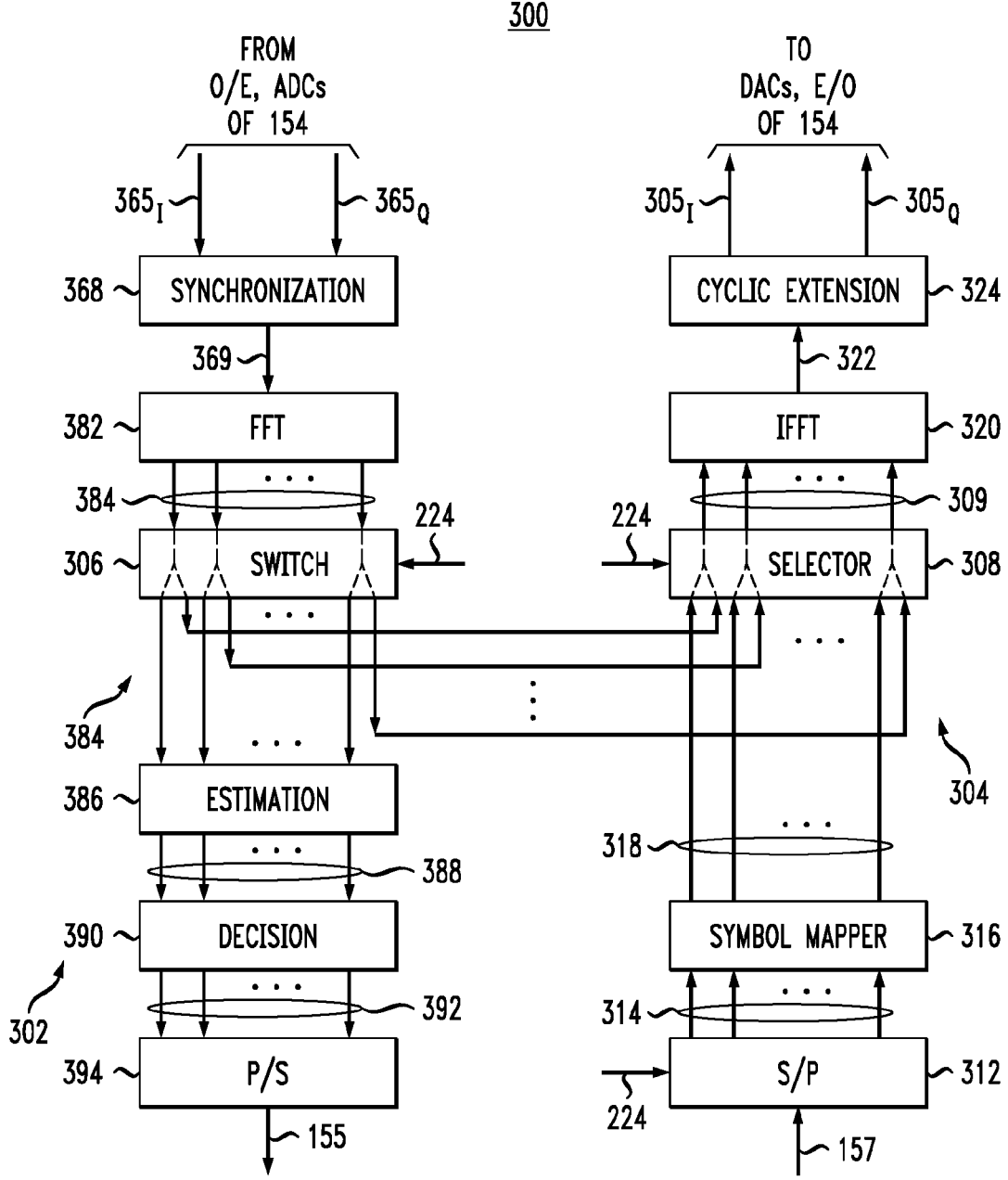
FIG. 3 shows a block diagram of a DSP that can be used in the optical transport system of FIG. 1 according to an embodiment.

FIG. 3 shows a block diagram of a DSP 300 that can be used in SWADM 154 (FIG. 1) according to an embodiment. DSP 300 comprises two interconnected processing branches: a receiver branch 302 and a transmitter branch 304. Receiver branch 302 receives digital electrical signals $365_I$ and $365_Q$ generated by the corresponding upstream circuitry (not explicitly shown in FIG. 3) of SWADM 154 and operates to output a tributary data stream 155 (also see FIG. 1). In an example embodiment, such upstream circuitry is configured to process optical OFDM signal 148 and may include (i) an O/E converter that is similar to O/E converter 162 (FIG. 1) and (ii) a pair of ADCs that are similar to ADCs 164 (FIG. 1). Transmitter branch 304 receives a tributary data stream 157 (FIG. 1) and operates to generate digital electrical signals $305_I$ and $305_Q$ that are directed to the corresponding downstream circuitry (not explicitly shown in FIG. 3) of SWADM 154. In an example embodiment, such downstream circuitry is configured to generate optical OFDM signal 158 and may include (i) a pair of DACs that are similar to DACs 106 (FIG. 1) and (ii) an E/O converter that is similar to E/O converter 108 (FIG. 1).

Receiver branch 302 comprises several signal-processing circuits or sub-units that are functionally analogous to the corresponding signal-processing circuits or sub-units of the receiver DSP 166 (FIG. 1). These signal-processing circuits or sub-units are labeled in FIGS. 1 and 3 using the labels having the same last two digits. In an example embodiment, receiver branch 302 includes the following signal-processing circuits or sub-units: a symbol-and-frequency synchronization circuit 368, an FFT circuit 382, a subcarrier switch 306, a channel-and-phase estimation circuit 386, a decision circuit 390, and a parallel-to-serial (P/S) converter 394.

The symbol-and-frequency synchronization performed by circuit 368 is directed at (i) correctly locating the beginning and end of a data frame 200 carried by optical OFDM signal 148 and (ii) compensating for the usually present frequency offset between the carrier wavelengths of optical OFDM signal 148 and the optical local-oscillator signal used in the O/E converter of SWADM 154. The output of circuit 368 is a digital complex-valued time-domain signal 369 that is partitioned into sections, each containing a corresponding OFDM symbol of data frame 200. FFT circuit 382 applies a Fourier-transform operation to each OFDM symbol carried by signal 369 to convert the OFDM symbol into a corresponding set of digital spectral components 384. Symbol-and-frequency synchronization circuit 368 and FFT circuit 382 operate substantially similar to symbol-and-frequency synchronization circuit 168 and FFT circuit 182, respectively (see FIG. 1).

The subsequent signal-processing flow in receiver branch 302 differs from that of DSP 166 due to the presence of subcarrier switch 306. The configuration of subcarrier switch 306 is determined by ADT indices 224 from header 220 of the respective data frame 200 (see FIG. 2). As such, the configuration of subcarrier switch 306 may change each time a new data frame 200 arrives. Depending on the value of the corresponding ADT index, subcarrier switch 306 directs each particular digital spectral component 384 either to transmitter branch 304 or to channel-and-phase estimation circuit 386. For example, for the above-described example embodiment of ADT indices 224, a digital spectral component 384 whose ADT index is either "01" or "11" is directed to circuit 386. In contrast, a digital spectral component 384 whose ADT index is "00" is directed to transmitter branch 304.

As already alluded to above, in some alternative embodiments, subcarrier switch 306 may carry out a "duplication" operation, using which the subcarrier switch can simultaneously direct a selected subset of the digital spectral components 384 both to transmitter branch 304 and to channel-and-phase estimation circuit 386.

The channel-and-phase estimation performed by circuit 386 is generally similar to that performed by circuit 186 (FIG. 1) and is directed at (i) estimating the channel transfer function for the corresponding portion of fiber-optic link 150 and (ii) estimating the phase noise. Circuit 386 uses the estimated channel transfer function and estimated phase noise to apply appropriate corrections to the received digital spectral components 384, thereby transforming them into a corresponding set of corrected digital spectral components 388. However, one difference between circuits 186 and 386 is that the former circuit operates on the full set of digital spectral components 184, whereas the latter circuit typically operates only on a subset of the full set of digital spectral components 384. For example, if the total number of subcarriers is N, and if subcarrier switch 306 directed M of the N digital spectral components 384 to transmitter branch 304, then circuit 386 operates only on N-M digital spectral components 384. As a result, circuit 386 typically experiences a much lower processing load than circuit 186 and, as such, can perform the pertinent signal processing relatively fast.

In some embodiments, e.g., when the latency requirements for SWADM 154 are not very stringent and/or the optical phase noise is relatively high, subcarrier switch 306 or a functional equivalent thereof can be placed downstream from circuit 386 or even downstream of decision circuit 390. A person of ordinary skill in the art will understand how to make the corresponding modifications in transmitter branch 304 as well.

Decision circuit 390 is generally similar to decision circuit 190 and operates to map each of the received corrected digital spectral components 388 onto the operative constellation, thereby generating a corresponding set of constellation symbols. Decision circuit 390 then decodes each constellation symbol to convert it into a corresponding data word, which is outputted by way of a respective one of parallel data streams 392. Similar to circuit 386, circuit 390 typically experiences a much lower processing load than circuit 190 because, according to the above example, circuit 390 needs to operate only on N-M corrected digital spectral components 388, whereas circuit 190 needs to operate on the full set of N corrected digital spectral components 188. As a result, circuit 390 can also perform the pertinent signal processing relatively fast.

P/S converter 394 is generally similar to P/S converter 194 and operates to appropriately multiplex data streams 392 to generate tributary data stream 155. As already indicated above, tributary data stream 155 carries the data that are not transferred from OFDM signal 148 to OFDM signal 158 and, instead, are dropped at SWADM 154.

Transmitter branch 304 comprises several signal-processing circuits or sub-units that are functionally analogous to the corresponding signal-processing circuits or sub-units of the transmitter DSP 104 (FIG. 1). These signal-processing circuits or sub-units are labeled in FIGS. 1 and 3 using the labels having the same last two digits. In an example embodiment, transmitter branch 304 includes the following signal-processing circuits or sub-units: an S/P converter 312, a symbol mapper 316, a subcarrier selector 308, an IFFT circuit 320, and a CE circuit 324.

S/P converter 312 splits the received tributary data stream 157 into multiple parallel data sub-streams 314. The manner of this splitting in S/P converter 312 is controlled by the relevant subset of ADT indices 224 (FIG. 2) that cause the S/P converter to place the sub-streams onto the proper bus lines that then appropriately apply the sub-streams to symbol mapper 316. The total number of (non-zero, non-pilot) parallel data streams 314 is logically equal to the total number of OFDM subcarriers that are indicated as being added by ADT indices 224. Symbol mapper 316 then uses the operative constellation to convert each of the received parallel data streams 314 into a corresponding one of constellation symbols 318, with each constellation symbol being also properly mapped onto the corresponding appropriate subcarrier to form a corresponding digital spectral component. For reasons similar to those mentioned above in reference to circuits 386, 390, and 394, S/P converter 312 and symbol mapper 316 typically experience a much lower processing load than S/P converter 112 and symbol mapper 116 in DSP 104 (FIG. 1) and, as such, can perform the pertinent signal processing relatively fast.

The configuration of subcarrier selector 308 is determined by ADT indices 224. Depending on the value of the corresponding ADT index, subcarrier selector 308 passes through either the respective digital spectral component 384 received from receiver branch 302 or the respective subcarrier-mapped constellation symbol 318 received from symbol mapper 316. For example, for the above-described example embodiment of ADT indices 224, subcarrier selector 308 passes through (i) the digital spectral components 384 with ADT indices "00" and (ii) constellation symbols 318 mapped onto the subcarriers whose ADT indices are "10" and "11."

IFFT circuit 320 operates to apply an inverse Fourier-transform operation to digital spectral components 309 passed by subcarrier selector 308 to generate a corresponding digital time-domain signal 322. CE circuit 324 then operates to add a cyclic extension to time-domain signal 322 and split a resulting extended digital time-domain signal into real and imaginary signal portions, thereby generating digital electrical drive signals $305_I$ and $305_Q$, respectively.

Figure 4:
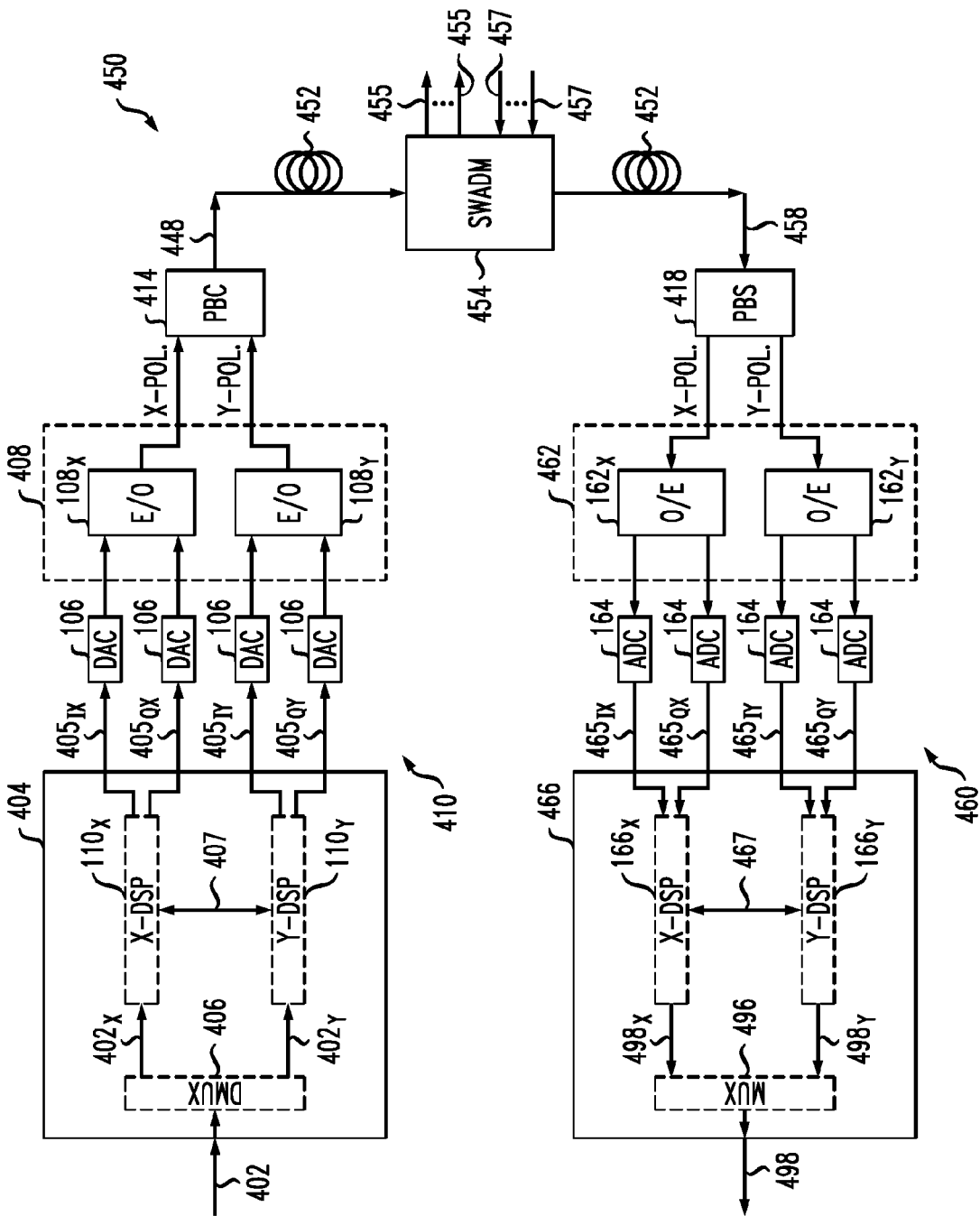
FIG. 4 shows a block diagram of an optical transport system according to an alternative embodiment.

FIG. 4 shows a block diagram of an optical transport system 400 according to an alternative embodiment. Optical transport system 400 comprises an optical OFDM transmitter 410 and an optical OFDM receiver 460 that are optically coupled to one another using a fiber-optic link 450. Fiber-optic link 450 comprises a SWADM 454 coupled between the corresponding sections of optical fiber 452. Optical transport system 400 is generally analogous to optical transport system 100 (FIG. 1), but is additionally enabled to handle polarization-division-multiplexed (PDM) optical OFDM signals. The following description of optical transport system 400 primarily focuses on the latter feature thereof.

Transmitter 410 has two channels configured to generate an X-polarized optical OFDM signal (X-Pol.) and a Y-polarized optical OFDM signal (Y-Pol.), respectively. Transmitter 410 also has a polarization beam combiner (PBC) 414 that combines these X- and Y-polarized optical OFDM signals to generate a PDM optical OFDM signal 448 that is then applied to fiber-optic link 450. In an example embodiment, each of the two channels of transmitter 410 can be generally similar to transmitter 110 (FIG. 1). For example, as indicated in FIG. 4, a DSP 404 of transmitter 410 can be implemented using two instances (nominal copies) of DSP 110, labeled as $110_X$ and $110_Y$. In some embodiments, DSPs $110_X$ and $110_Y$ may share or have in common some of their processing circuits/sub-units and/or coordinate their operations as schematically indicated in FIG. 4 by the double-headed arrow 407. A DMUX 406 operates to appropriately de-multiplex an input data stream 402 to provide the resulting data streams $402_X$ and $402_Y$ as inputs to DSPs $110_X$ and $110_Y$, respectively.

An E/O converter 408 can similarly be implemented using two instances of E/O converter 108, labeled as $108_X$ and $108_Y$. In some embodiments, E/O converters $108_X$ and $108_Y$ may have a common laser 128 (see FIG. 1). A person of ordinary skill in the art will understand that E/O converter 408 may further include polarization beam splitters/combiners and/or polarization rotators (not explicitly shown in FIG. 4).

Receiver 460 similarly has two channels configured to process the X- and Y-polarization components (X-Pol. And Y-Pol.), respectively, of a PDM optical OFDM signal 458 received from fiber-optic link 450. A polarization beam splitter (PBS) 418 operates to separate the X- and Y-polarization components from one another and apply each separated polarization component to the respective channel of receiver 460. In an example embodiment, each of the two channels of receiver 460 can be generally similar to receiver 160 (FIG. 1). For example, as indicated in FIG. 4, an O/E converter 462 of receiver 460 can be implemented using two instances of O/E converter 162, labeled as $162_X$ and $162_Y$. In some embodiments, O/E converters $162_X$ and $162_Y$ may have a common local-oscillator laser 170 (see FIG. 1). A person of ordinary skill in the art will understand that O/E converter 462 may further include polarization beam splitters/combiners and/or polarization rotators (not explicitly shown in FIG. 4).

A DSP 466 of receiver 460 can similarly be implemented using two instances of DSP 166, labeled as $166_X$ and $166_Y$. DSP $166_X$ receives digital signals $465_{IX}$ and $465_{QX}$ corresponding to the X-polarization of PDM optical OFDM signal 458. DSP $166_Y$ similarly receives digital signals $465_{IY}$ and $465_{QY}$ corresponding to the Y-polarization of PDM optical OFDM signal 458. In some embodiments, DSPs $166_X$ and $166_Y$ may share or have in common some of the processing circuits/sub-units and/or coordinate their operations as schematically indicated in FIG. 4 by the double-headed arrow 467. Control signal 467 can also be used to implement electronic polarization demultiplexing. A MUX 496 operates to appropriately multiplex the output data streams $498_X$ and $498_Y$ generated by DSPs $166_X$ and $166_Y$, respectively, to generate an output data stream 498.

SWADM 454 is functionally analogous to SWADM 154 (FIG. 1), but is additionally enabled to add/drop data carried by individual subcarriers of either polarization of the corresponding PDM optical OFDM signal. For example, SWADM 454 receives PDM optical OFDM signal 448 from transmitter 410 and transmits PDM optical OFDM signal 458 to receiver 460. In its capacity as a sub-wavelength sink, SWADM 454 processes PDM optical OFDM signal 448 such that (i) payload data carried by a first subset of subcarriers of the X-polarization of PDM optical OFDM signal 448 are dropped using one or more tributary data streams 455; (ii) payload data carried by a second subset of subcarriers of the X-polarization of PDM optical OFDM signal 448 are transferred to the corresponding subcarriers of the X-polarization of optical OFDM signal 458; (iii) payload data carried by a third subset of subcarriers of the Y-polarization of PDM optical OFDM signal 448 are dropped using one or more tributary data streams 455; (iv) payload data carried by a fourth subset of subcarriers of the Y-polarization of PDM optical OFDM signal 448 are transferred to the corresponding subcarriers of the Y-polarization of optical OFDM signal 458. In its capacity as a sub-wavelength source, SWADM 454 generates PDM optical OFDM signal 458 such that (i) payload data carried by a first subset of subcarriers of the X-polarization of PDM optical OFDM signal 458 originate from one or more tributary data streams 457 received by the SWADM; (ii) payload data carried by a second subset of subcarriers of the X-polarization of PDM optical OFDM signal 458 are transferred thereto from the corresponding subcarriers of the X-polarization of PDM optical OFDM signal 448; (iii) payload data carried by a third subset of subcarriers of the Y-polarization of PDM optical OFDM signal 458 originate from one or more tributary data streams 457; and (iv) payload data carried by a fourth subset of subcarriers of the Y-polarization of PDM optical OFDM signal 458 are transferred thereto from the corresponding subcarriers of the Y-polarization of PDM optical OFDM signal 448.

Figure 5:
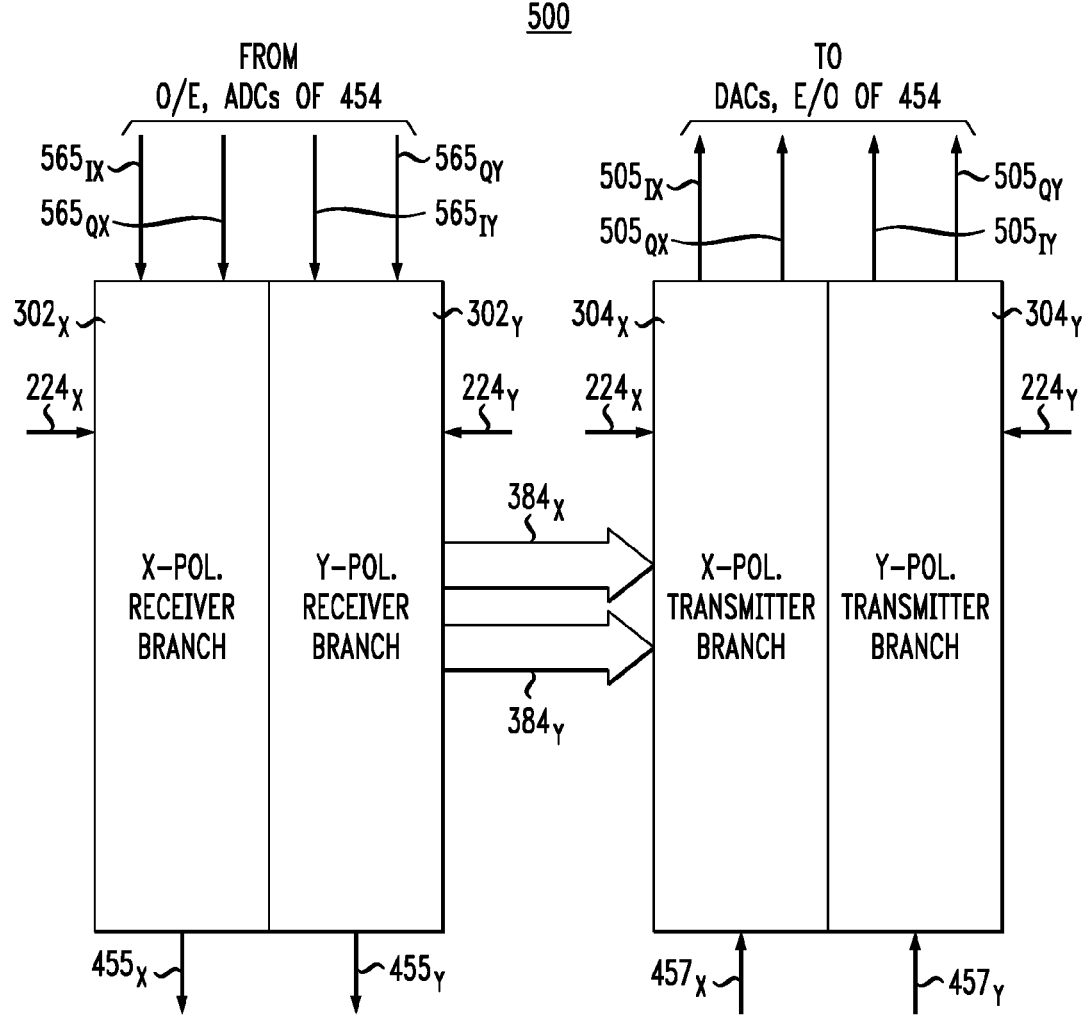
FIG. 5 shows a block diagram of a DSP that can be used in the optical transport system of FIG. 4 according to an embodiment.

FIG. 5 shows a block diagram of a DSP 500 that can be used in SWADM 454 (FIG. 4) according to an embodiment. DSP 400 comprises (i) two receiver branches 302, labeled $302_X$ and $302_Y$, and (ii) two transmitter branches 304, labeled $304_X$ and $304_Y$. Receiver branch $302_X$ and transmitter branch $304_X$ process digital signals corresponding to the X-polarization. Receiver branch $302_Y$ and transmitter branch $304_Y$ similarly process digital signals corresponding to the Y-polarization. In an example embodiment, receiver branches $302_X$ and $302_Y$ may share or have in common some of the processing circuits/sub-units (also see FIG. 3). Transmitter branches $304_X$ and $304_Y$ may similarly share or have in common some of the processing circuits/sub-units (also see FIG. 3). Some embodiments of DSP 500 may use a receiver-branch structure in which subcarrier switch 306 or a functional equivalent thereof is placed downstream from circuit 386.

Receiver branch $302_X$ receives digital electrical signals $565_{IX}$ and $565_{QX}$ generated by the corresponding upstream circuitry (not explicitly shown in FIG. 5) of SWADM 454 and operates to output a tributary data stream $455_X$ (also see FIG. 4). Receiver branch $302_Y$ similarly receives digital electrical signals $565_{IY}$ and $565_{QY}$ generated by the upstream circuitry of SWADM 454 and operates to output tributary data stream $455_Y$. In an example embodiment, the upstream circuitry is configured to process optical OFDM signal 448 and may include (i) an O/E converter that is similar to O/E converter 462 (FIG. 4) and (ii) four ADCs that are similar to ADCs 164 (FIG. 4).

Transmitter branch $304_X$ receives a tributary data stream $457_X$ (also see FIG. 4) and operates to generate digital electrical signals $505_{IX}$ and $505_{QX}$ that are directed to the corresponding downstream circuitry (not explicitly shown in FIG. 4) of SWADM 454 (FIG. 4). Transmitter branch $304_Y$ similarly receives a tributary data stream $457_Y$ (also see FIG. 4) and operates to generate digital electrical signals $505_{IY}$ and $505_{QY}$ that are directed to the downstream circuitry of SWADM 454. In an example embodiment, such downstream circuitry is configured to generate optical OFDM signal 458 and may include (i) four DACs that are similar to DACs 106 (FIG. 4) and (ii) an E/O converter that is similar to E/O converter 408 (FIG. 4).

The configurations of subcarrier switches 306 (also see FIG. 3) of receiver branches $302_X$ and $302_Y$ are determined by ADT indices $224_X$ and $224_Y$, respectively, from headers 220 of the respective data frames 200 (see FIG. 2) transported using the X- and Y-polarizations of light. Depending on the values of ADT indices $224_X$ and $224_Y$, subcarrier switches 306 can drop some of the digital spectral components 384 and transfer some other digital spectral components 384 to transmitter branches $304_X$ and $304_Y$ in a subcarrier-specific manner, e.g., as already explained above in reference to FIG. 3. The transfer of digital spectral components 384 from receiver branches $302_X$ and $302_Y$ to transmitter branches $304_X$ and $304_Y$ is indicated in FIG. 5 by block arrows $384_X$ and $384_Y$. The configurations of subcarrier selectors 308 (also see FIG. 3) of transmitter branches $304_X$ and $304_Y$ are similarly determined by the ADT indices $224_X$ and $224_Y$. Depending on the values of ADT indices $224_X$ and $224_Y$, transmitter branches $304_X$ and $304_Y$ can perform their pass-through and add operations in a subcarrier-specific manner, e.g., as already explained above in reference to FIG. 3.

Figure 6:
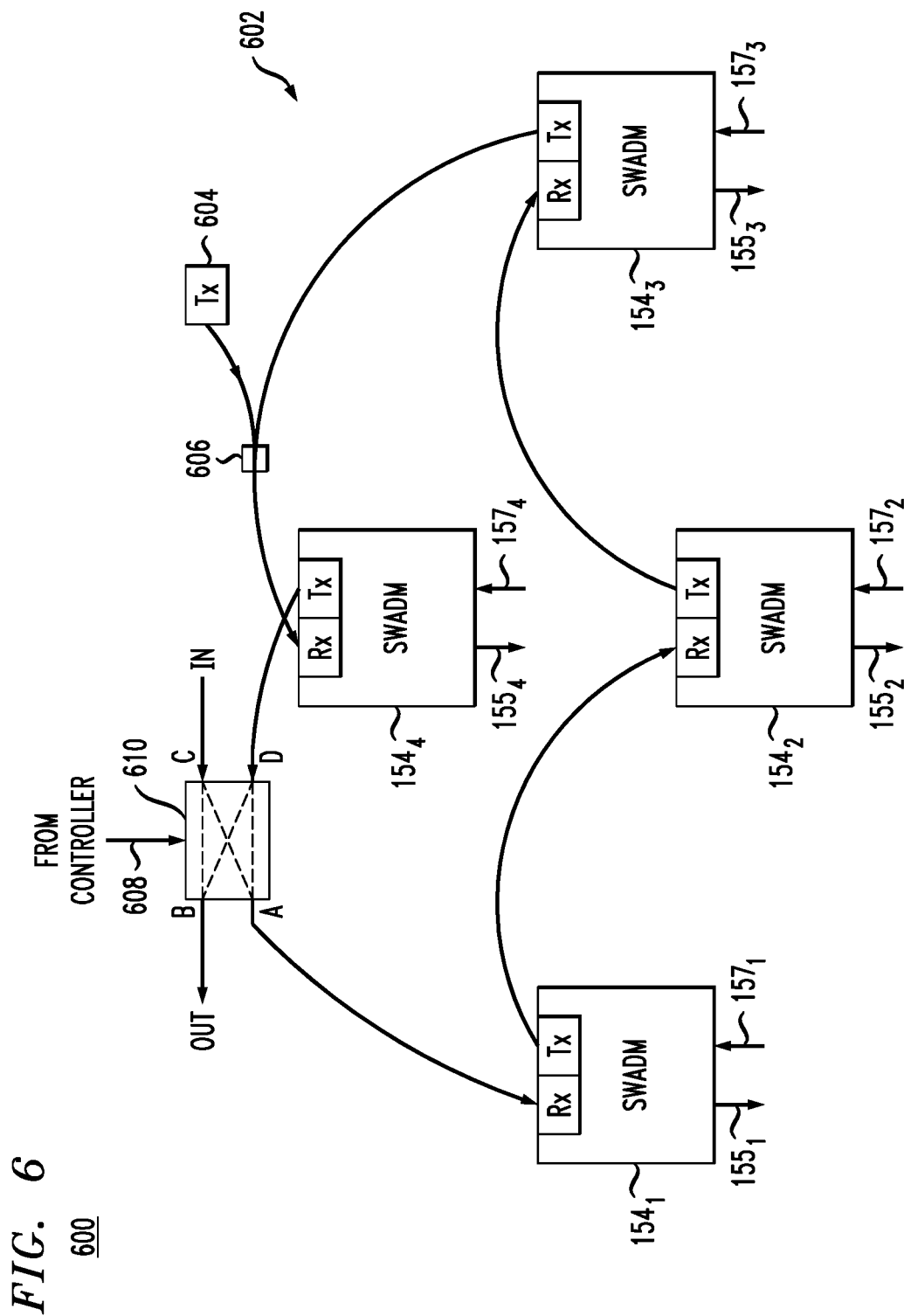
FIG. 6 shows a block diagram of an aggregation switch according to an embodiment.

FIG. 6 shows a block diagram of an aggregation switch 600 that employs a plurality of SWADMs 154 (FIG. 1) according to an embodiment. As an example, an embodiment having four SWADMs 154 is shown in FIG. 6. A person of ordinary skill in the art will appreciate that alternative embodiments of aggregation switch 600 may similarly employ more or fewer than four SWADMs 154.

SWADMs $154_1$-$154_4$ are connected to one another in aggregation switch 600 to form a ring 602, wherein a transmitter branch Tx of the preceding SWADM 154 feeds a receiver branch Rx of the following SWADM 154. An optical OFDM signal can be generated within ring 602, e.g., using one of one or more optional optical transmitters 604, only one of which is shown in FIG. 6 for illustration purposes as being coupled to one of the optical links (e.g., optical fibers) of the ring by way of an optical coupler 606. In an example embodiment, optical transmitters 604 can be similar to optical transmitter 110 (FIG. 1).

Alternatively or in addition, an optical OFDM signal can be injected and/or ejected from ring 602 using an optional 2×2 optical switch 610. A switch controller can control the configuration of optical switch 610 using a control signal 608. To inject an external optical OFDM signal into ring 602, control signal 608 causes optical switch 610 to connect an input port C and an output port A of the switch. To eject an optical OFDM signal from ring 602, control signal 608 causes optical switch 610 to connect an input port D and an output port B of the switch. To circulate an optical OFDM signal through ring 602, control signal 608 causes optical switch 610 to connect input port D and output port A of the switch. To cause an external optical OFDM signal to bypass ring 602, control signal 608 causes optical switch 610 to connect input port C and output port B of the switch.

In operation, aggregation switch 600 can be used to aggregate tributary data streams $157_1$-$157_4$ into a single optical OFDM signal such that the signal payload exceeds a selected fraction of the signal's total data-carrying capacity. For example, to carry out an aggregation operation, optical switch 610 can be configured to circulate the corresponding optical OFDM signal through ring 602. Each SWADM $154_i$ (where i=1, 2, 3, 4) can then add data supplied by the respective tributary data stream $157_i$ to the circulating OFDM signal such that the added data are carried by the previously unoccupied subcarriers thereof. When the circulating OFDM signal is loaded with data such that the signal payload exceeds the selected fraction of the signal's total data-carrying capacity, optical switch 610 can be reconfigured to eject the OFDM signal from ring 602.

Figure 7:
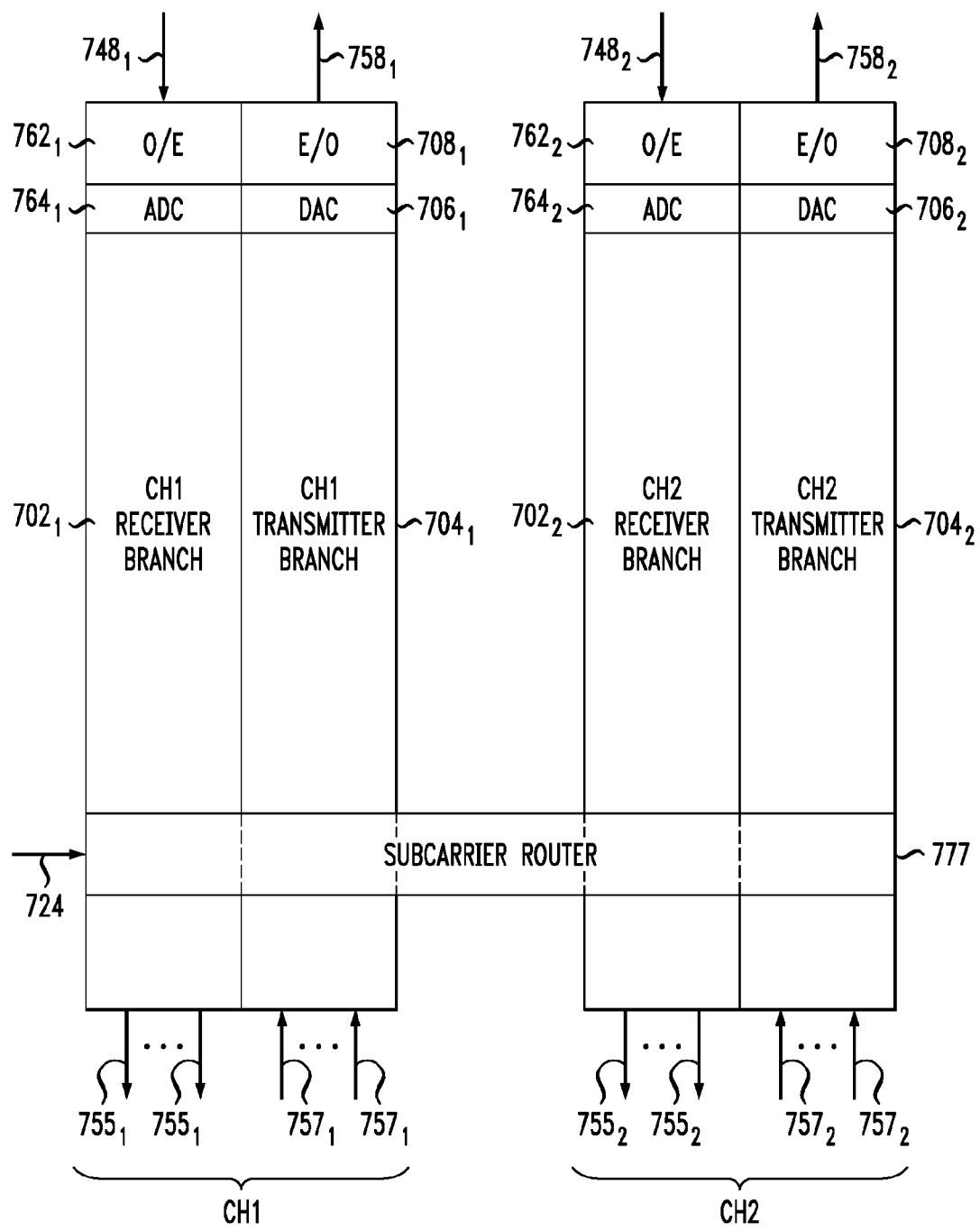
FIG. 7 shows a block diagram of a multichannel sub-wavelength add-drop multiplexer according to an embodiment.

FIG. 7 shows a block diagram of a multichannel SWADM 700 according to an embodiment. More specifically, SWADM 700 has two optical OFDM channels, which are labeled CH1 and CH2, respectively. Each of channels CH1 and CH2 includes: (i) a respective one of O/E converters $762_1$ and $762_2$; (ii) a respective one of E/O converters $708_1$ and $708_2$; (iii) a respective one of ADC banks $764_1$ and $764_2$; (iv) a respective one of DAC banks $706_1$ and $706_2$; (v) a respective one of DSP receiver branches $702_1$ and $702_2$; and (vi) a respective one of DSP transmitter branches $704_1$ and $704_2$.

In an example embodiment, each of O/E converters $762_1$ and $762_2$ can be similar to O/E converter 162 (FIG. 1). Each of E/O converters $708_1$ and $708_2$ can be similar to E/O converter 108 (FIG. 1). Each of ADC banks $764_1$ and $764_2$ can include two ADCs 164 (FIG. 1). Each of DAC banks $706_1$ and $706_2$ can include two DACs 106 (FIG. 1).

Each of DSP receiver branches $702_1$ and $702_2$ is generally analogous to DSP receiver branch 302 (FIG. 3), with the exception of the modifications of the corresponding subcarrier switch, which are described in more detail below in reference to FIG. 8. Similarly, each of DSP transmitter branches $704_1$ and $704_2$ is generally analogous to DSP transmitter branch 304 (FIG. 3), with the exception of the modifications of the corresponding subcarrier selector, which are described in more detail below in reference to FIG. 8. In an example embodiment, the modifications to the DSP receiver and transmitter branches include replacement of two subcarrier switches 306 and two subcarrier selectors 308 by a subcarrier router 777, an example structure of which is shown in FIG. 8.

SWADM 700 operates to: (i) receive two optical OFDM signals $748_1$ and $748_2$ and (ii) output another two optical OFDM signals $758_1$ and $758_2$. In an example embodiment, subcarrier router 777 enables SWADM 700 to individually handle the various subcarriers of optical OFDM signals $748_1$, $748_2$, $758_1$, and $758_2$ as follows. A data stream carried by a subcarrier of optical OFDM signal $748_1$ can be: (i) dropped as one of tributary data streams $755_1$; (ii) transferred to be carried by the corresponding subcarrier of optical OFDM signal $758_1$; or (iii) transferred to be carried by the corresponding subcarrier of optical OFDM signal $758_2$. A data stream carried by a subcarrier of optical OFDM signal $748_2$ can be: (i) dropped as one of tributary data streams $755_2$; (ii) transferred to be carried by the corresponding subcarrier of optical OFDM signal $758_1$; or (iii) transferred to be carried by the corresponding subcarrier of optical OFDM signal $758_2$. A data stream carried by a subcarrier of optical OFDM signal $758_1$ can originate from:

(i) one of tributary data streams $757_1$; (ii) the corresponding subcarrier of optical OFDM signal $748_1$; or (iii) the corresponding subcarrier of optical OFDM signal $748_2$. A data stream carried by a subcarrier of optical OFDM signal $758_2$ can originate from: (i) one of tributary data streams $757_2$; (ii) the corresponding subcarrier of optical OFDM signal $748_1$; or (iii) the corresponding subcarrier of optical OFDM signal $748_2$.

The configuration of subcarrier router 777 determines which route each particular subcarrier is directed along and can be dynamically changed using a control signal 724. In various embodiments, control signal 724 can be generated by a routing controller (not explicitly shown in FIG. 7) and/or based on the corresponding ADT indices (e.g., analogous to ADT indices 224, FIG. 2) from the corresponding frame header. An appropriate scheduling algorithm can be used, e.g., as known in the pertinent art, to generate control signal 724 in a manner that prevents subcarrier collisions in subcarrier router 777.

In some embodiments, subcarrier router 777 may be operable to implement a "duplication" procedure, using which SWADM 700 can simultaneously direct a data stream carried by a subcarrier to more than one destination. In accordance with this feature, subcarrier router 777 can, for example, be configured to cause SWADM 700 to (i) pass an OFDM subcarrier from optical OFDM signal $748_1$ to optical OFDM signal $758_1$ and/or optical OFDM signal $758_2$ and (ii) sink a copy of the data stream carried by that particular OFDM subcarrier of optical OFDM signal $748_1$ into one of tributary data streams $755_1$. Subcarrier router 777 can further be configured to cause SWADM 700 to (i) pass an OFDM subcarrier from optical OFDM signal $748_2$ to optical OFDM signal $758_1$ and/or optical OFDM signal $758_2$ and (ii) sink a copy of the data stream carried by that particular OFDM subcarrier of optical OFDM signal $748_2$ into one of tributary data streams $755_2$.

FIG. 8 shows a block diagram of subcarrier router 777 according to an embodiment. The embodiment shown in FIG. 8 corresponds to the location of subcarrier router 777 in the processing chain, in which: (i) each of subcarrier switches $806_1$ and $806_2$ receives digital spectral components 384 through the corresponding one of channels CH1 and CH2 and (ii) subcarrier selectors $808_1$ and $808_2$ output digital spectral components 309 through the corresponding one of channels CH1 and CH2 (also see FIG. 3). As already indicated above in reference to FIG. 3, alternative locations of the subcarrier switches and subcarrier selectors are also possible in alternative embodiments of the DSP transmitter and receiver branches used in SWADM 700 (FIG. 7).

Depending on the routing configuration specified by control signal 724 (FIG. 7), subcarrier switch $806_1$ operates to individually route each of digital spectral components $384_1$ to one or more of the following three destinations: (i) to channel-and-phase estimation circuit $386_1$ of channel CH1; (ii) to subcarrier selector $808_1$ of channel CH1; and (iii) to subcarrier selector $808_2$ of channel CH2 (also see FIG. 3). Subcarrier switch $806_2$ similarly operates to individually route each of digital spectral components $384_2$ to one or more of the following three destinations: (i) to channel-and-phase estimation circuit $386_2$ of channel CH2; (ii) to subcarrier selector $808_1$ of channel CH1; and (iii) to subcarrier selector $808_2$ of channel CH2. Subcarrier switches $806_1$ and $806_2$ can direct a digital spectral component 384 to more than one destination only if the above-described "duplication" procedure is enabled in the corresponding embodiment of subcarrier router 777 and is triggered by control signal 724 during operation thereof.

Subcarrier selector $808_1$ operates to output each of digital spectral components $309_1$ by selecting one of the three corresponding digital spectral components received from the following three sources: (i) from symbol mapper $316_1$ of channel CH1; (ii) from subcarrier switch $806_1$ of channel CH1; and (iii) from subcarrier switch $806_2$ of channel CH2. Subcarrier selector $808_2$ similarly operates to output each of digital spectral components $309_2$ by selecting one of the three corresponding digital spectral components received from the following three sources: (i) from symbol mapper $316_2$ of channel CH2; (ii) from subcarrier switch $806_1$ of channel CH1; and (iii) from subcarrier switch $806_2$ of channel CH2. As already indicated above, control signal 724 is normally generated in a manner that prevents subcarrier collisions at subcarrier selectors $808_1$ and $808_2$.

Although multichannel SWADM 700 was described above in reference to an example embodiment having N=2 channels, alternative embodiments corresponding to N>2 are also possible. From the provided description, a person of ordinary skill in the art will be able to appropriately modify the above-described two-channel embodiments of SWADM 700 and subcarrier router 777 to make and use, without undue experimentation, a multichannel SWADM having N>2 channels.

According to an example embodiment disclosed above in reference to FIGS. 1-8, provided is an apparatus (e.g., 100, FIG. 1; 400, FIG. 4) comprising an optical add-drop multiplexer (e.g., 154, FIG. 1; 454, FIG. 4) configured to receive a first optical signal (e.g., 148, FIG. 1; 448, FIG. 4) and to generate a second optical signal (e.g., 158, FIG. 1; 458, FIG. 4), each of the first and second optical signals being an optical OFDM signal, wherein the optical add-drop multiplexer comprises a first receiver branch (e.g., 302, FIGS. 3, 5) and a first transmitter branch (e.g., 304, FIGS. 3, 5). The first receiver branch is configured to: apply a Fourier-transform operation (e.g., using 382, FIG. 3) to a first digital time-domain signal (e.g., 369, FIG. 3) corresponding to the first optical signal to generate a first set of digital spectral components (e.g., 384, FIG. 3), each corresponding to a respective OFDM subcarrier; transfer (e.g., using 306, FIG. 3) a first subset of the first set of digital spectral components (e.g., 384 directed from 306 to 308, FIG. 3) to the first transmitter branch; and process (e.g., using 386, 390, 394, FIG. 3) a second subset of the first set of digital spectral components to generate a first output data stream (e.g., 155, FIG. 3) that carries data encoded in the second subset of the first set of digital spectral components. The first transmitter branch is configured to apply an inverse Fourier-transform operation (e.g., using 320, FIG. 3) to a second set of digital spectral components (e.g., 309, FIG. 3), each corresponding to a respective OFDM subcarrier, to generate a second digital time-domain signal (e.g., 322, FIG. 3), wherein the second set of digital spectral components includes the first subset of the first set of digital spectral components received from the first receiver branch. The optical add-drop multiplexer is further configured to use the second digital time-domain signal (e.g., using 324, DACs, and E/O, FIG. 3) to generate the second optical signal in a manner that causes the second optical signal to carry data encoded in the first subset of the first set of digital spectral components.

In some embodiments of the above apparatus, the optical add-drop multiplexer is configured to generate the second optical signal in a manner that causes the second optical signal not to carry the data encoded in the second subset of the first set of digital spectral components.

In some embodiments of any of the above apparatus, the first transmitter branch is configured to: receive a first input data stream (e.g., 157, FIG. 3); and generate (e.g., using 312, 316, FIG. 3) a third subset of digital spectral components (e.g., some of 318, FIG. 3) having encoded thereon data carried by the first input data stream, wherein the second set of digital spectral components includes the third subset of digital spectral components.

In some embodiments of any of the above apparatus, the optical add-drop multiplexer is configured to generate the second optical signal in a manner that causes the second optical signal to also carry data encoded in the third subset of digital spectral components.

In some embodiments of any of the above apparatus, the second subset of the first set of digital spectral components and the third subset of digital spectral components have at least one OFDM subcarrier in common.

In some embodiments of any of the above apparatus, the first subset of the first set of digital spectral components and the third subset of digital spectral components have no OFDM subcarriers in common.

In some embodiments of any of the above apparatus, the second subset of the first set of digital spectral components and the third subset of digital spectral components have no OFDM subcarriers in common.

In some embodiments of any of the above apparatus, the optical add-drop multiplexer is configured to read one or more ADT indices (e.g., 224, FIG. 2) from a header of a data frame (e.g., 200, FIG. 2) carried by the first optical signal.

In some embodiments of any of the above apparatus, the first transmitter branch is configurable (e.g., using control of 308 by 224, FIG. 3) to generate the third subset of digital spectral components using the one or more ADT indices.

In some embodiments of any of the above apparatus, the first receiver branch is configurable (e.g., using control of 306 by 224, FIG. 3) to sort the first set of digital spectral components into the first subset and the second subset thereof using the one or more ADT indices.

In some embodiments of any of the above apparatus, the optical add-drop multiplexer is configured to read one or more ADT indices (e.g., 224, FIG. 2) from a header of a data frame (e.g., 200, FIG. 2) carried by the first optical signal, wherein the first receiver branch is configurable (e.g., using control of 306 by 224, FIG. 3) to sort the first set of digital spectral components into the first subset and the second subset thereof using the one or more ADT indices.

In some embodiments of any of the above apparatus, the optical add-drop multiplexer further comprises a second receiver branch (e.g., 302$_Y$, FIG. 5) and a second transmitter branch (e.g., 304$_Y$, FIG. 5). The second receiver branch is configured to: apply a Fourier-transform operation (e.g., using 382, FIG. 3) to a third digital time-domain signal (e.g., 369, FIG. 3) corresponding to the first optical signal to generate a third set of digital spectral components (e.g., 384, FIG. 3), each corresponding to a respective OFDM subcarrier; transfer (e.g., using 306, FIG. 3) a third subset of the third set of digital spectral components (e.g., 384 directed from 306 to 308, FIG. 3) to the second transmitter branch; and process (e.g., using 386, 390, 394, FIG. 3) a fourth subset of the third set of digital spectral components to generate a second output data stream (e.g., 455$_Y$, FIG. 5) that carries data encoded in the fourth subset of the third set of digital spectral components. The second transmitter branch is configured to apply an inverse Fourier-transform operation (e.g., using 320, FIG. 3) to a fourth set of digital spectral components (e.g., 309, FIG. 3), each corresponding to a respective OFDM subcarrier, to generate a fourth digital time-domain signal (e.g., 322, FIG. 3), wherein the fourth set of digital spectral components includes the third subset of the third set of digital spectral components received from the second receiver branch. The optical add-drop multiplexer is further configured to use the fourth digital time-domain signal (e.g., using DACs, and E/O, FIG. 5) to generate the second optical signal in a manner that causes the second optical signal to carry data encoded in the third subset of the third set of digital spectral components. The first and third digital time-domain signals correspond to a first polarization (e.g., X-Pol., FIG. 4) and a second polarization (e.g., Y-Pol., FIG. 4), respectively, of the first optical signal. The third and fourth digital time-domain signals correspond to the first polarization and the second polarization, respectively, of the second optical signal.

In some embodiments of any of the above apparatus, the second transmitter branch is configured to: receive a second input data stream (e.g., 457$_Y$, FIG. 5); and generate (e.g., using 312, 316, FIG. 3) a fifth subset of digital spectral components (e.g., some of 318, FIG. 3) having encoded thereon data carried by the second input data stream, wherein the fourth set of digital spectral components includes the fifth subset of digital spectral components.

In some embodiments of any of the above apparatus, the optical add-drop multiplexer is configured to generate the second optical signal in a manner that causes the second optical signal to also carry data encoded in the fifth subset of digital spectral components.

In some embodiments of any of the above apparatus, the optical add-drop multiplexer is configured to generate the second optical signal in a manner that causes the second optical signal not to carry the data encoded in the fourth subset of the third set of digital spectral components.

According to another example embodiment disclosed above in reference to FIGS. 1-8, provided is an apparatus (e.g., 100, FIG. 1; 400, FIG. 4) comprising an optical add-drop multiplexer (e.g., 154, FIG. 1; 454, FIG. 4) configured to receive a first optical signal (e.g., 148, FIG. 1; 448, FIG. 4) and to generate a second optical signal (e.g., 158, FIG. 1; 458, FIG. 4), each of the first and second optical signals being an optical OFDM signal, wherein the optical add-drop multiplexer comprises a first receiver branch (e.g., 302, FIGS. 3, 5) and a first transmitter branch (e.g., 304, FIGS. 3, 5). The first receiver branch is configured to: apply a Fourier-transform operation (e.g., using 382, FIG. 3) to a first digital time-domain signal (e.g., 369, FIG. 3) corresponding to the first optical signal to generate a first set of digital spectral components (e.g., 384, FIG. 3), each corresponding to a respective OFDM subcarrier; and transfer (e.g., using 306, FIG. 3) a first subset of the first set of digital spectral components (e.g., 384 directed from 306 to 308, FIG. 3) to the first transmitter branch. The first transmitter branch is configured to: receive a first input data stream (e.g., 157, FIG. 3); generate (e.g., using 312, 316, FIG. 3) a second subset of digital spectral components (e.g., some of 318, FIG. 3) having encoded thereon data carried by the first input data stream; and apply an inverse Fourier-transform operation (e.g., using 320, FIG. 3) to a second set of digital spectral components (e.g., 309, FIG. 3), each corresponding to a respective OFDM subcarrier, to generate a second digital time-domain signal (e.g., 322, FIG. 3), wherein the second set of digital spectral components includes the first subset of the first set of digital spectral components received from the first receiver branch and the second subset of digital spectral components. The optical add-drop multiplexer is further configured to use the second digital time-domain signal (e.g., using 324, DACs, and E/O, FIG. 3) to generate the second optical signal in a manner that causes the second optical signal to carry data encoded in the first subset of the first set of digital spectral components and in the second subset of digital spectral components.

In some embodiments of the above apparatus, the first subset of the first set of digital spectral components and the second subset of digital spectral components have no OFDM subcarriers in common.

In some embodiments of any of the above apparatus, the first set of digital spectral components and the second subset of digital spectral components have at least one OFDM subcarrier in common.

In some embodiments of any of the above apparatus, the first set of digital spectral components and the second subset of digital spectral components have no OFDM subcarriers in common.

According to yet another example embodiment disclosed above in reference to FIGS. 1-8, provided is a communication method comprising the step of handling (e.g., by means of 110, 154, or 160, FIG. 1) an optical signal (e.g., 148 or 158, FIG. 1) having encoded thereon a data frame (e.g., 200, FIG. 2) that comprises a header (e.g., 220, FIG. 2) and a payload (e.g., 230, FIG. 2); wherein the payload includes a plurality of OFDM subcarriers modulated with data; and wherein the header includes one or more ADT indices (e.g., 224, FIG. 2), each ADT index corresponding to a respective one of the OFDM subcarriers or a respective set of the OFDM subcarriers and encoding a respective instruction that specifies a routing operation to be applied by an optical add-drop multiplexer (e.g., 154, FIG. 1; 454, FIG. 4) to the respective one of the OFDM subcarriers or the respective set of the OFDM subcarriers, the routing operation comprising one or more of dropping, passing through, and adding the respective one of the OFDM subcarriers or the respective set of the OFDM subcarriers. As used herein, the phrase "handling an optical signal" should be construed to cover any one or more of the following steps: (i) generating an optical signal, e.g., in a manner similar to that used by transmitter 110 for optical signal 148, FIG. 1; (ii) receiving an optical signal, e.g., in a manner similar to that used by receiver 150 for optical signal 158, FIG. 1; and (iii) processing an optical signal in a subcarrier-specific manner, e.g., as performed by SWADM 154, FIG. 1.

In some embodiments of the above method, the header includes at least two ADT indices that specify (i) a first routing operation for a first OFDM subcarrier of the plurality and (ii) a second routing operation for a second OFDM subcarrier of the plurality, the second routing operation being different from the first routing operation.

In some embodiments of any of the above methods, each ADT index corresponds to the respective set of the OFDM subcarriers having at least two OFDM subcarriers.

According to yet another example embodiment disclosed above in reference to FIGS. 1-8, provided is an apparatus (e.g., 600, FIG. 6) comprising: two or more SWADMs (e.g., 154$_1$-154$_4$, FIG. 6) optically connected to one another in a ring (e.g., 602, FIG. 6); and means (e.g., 604-610, FIG. 6) for causing an optical OFDM signal to circulate through the ring. Each of the two or more SWADMs is configured to modify the optical OFDM signal by causing a previously vacant subcarrier thereof to carry data, with the optical OFDM signal modifications being performed while the optical OFDM signal is circulating through the ring.

In some embodiments of the above apparatus, the means for causing comprises an optical switch (e.g., 610, FIG. 6) switchable into at least a first configuration and a second configuration, wherein the first configuration of the optical switch causes the optical OFDM signal to circulate through the ring; and wherein the second configuration of the optical switch causes the optical OFDM signal to be ejected from the ring.

In some embodiments of any of the above apparatus, the optical switch is configurable to eject the optical OFDM signal from the ring when a size of a payload of the optical OFDM signal exceeds a threshold size.

In some embodiments of any of the above apparatus, the means for causing comprises an optical transmitter (e.g., 604, FIG. 6) optically coupled to the ring and configured to launch the optical OFDM signal within the ring.

According to yet another example embodiment disclosed above in reference to FIGS. 1-8, provided is an apparatus (e.g., 700, FIG. 7) comprising: a first electro-optical channel (e.g., CH1, FIG. 7) configured to (i) receive a first optical orthogonal frequency-division multiplexed (OFDM) signal (e.g., 748$_1$, FIG. 7) and (ii) generate a second optical OFDM signal (e.g., 758$_1$, FIG. 7); a second electro-optical channel (e.g., CH2, FIG. 7) configured to (i) receive a third optical OFDM signal (e.g., 748$_2$, FIG. 7) and (ii) generate a fourth optical OFDM signal (e.g., 758$_2$, FIG. 7); and an electronic subcarrier router (e.g., 777, FIGS. 7-8) that connects the first electro-optical channel and the second electro-optical channel in a manner that enables the apparatus to perform one or more of the following operations: cause a data set carried by a subcarrier of the first optical OFDM signal to be (i) dropped into a respective tributary data stream (e.g., 755$_1$, FIG. 7); (ii) transferred to be carried by a corresponding subcarrier of the second optical OFDM signal; and/or (iii) transferred to be carried by a corresponding subcarrier of the fourth optical OFDM signal; and cause a data set carried by a subcarrier of the third optical OFDM signal to be (i) dropped into a respective tributary data stream (e.g., 755$_2$, FIG. 7); (ii) transferred to be carried by a corresponding subcarrier of the second optical OFDM signal; and/or (iii) transferred to be carried by a corresponding subcarrier of the fourth optical OFDM signal.

While this disclosure includes references to illustrative embodiments, this specification is not intended to be construed in a limiting sense.

Although various embodiments are described above in reference to optical OFDM signals, at least some of the inventive concepts are also applicable to optical signals that are generated using multicarrier modulation. In particular, inventive concepts are applicable to coherent multicarrier signals whose (sub)carriers are generated by appropriately modulating a single carrier wavelength, without a concomitant requirement for said (sub)carriers to be mutually orthogonal. Coherent multicarrier signals differ from conventional WDM and DWDM signals in that conventional WDM and DWDM signals are typically generated using a bank of free-running lasers that provide the corresponding multiple carrier wavelengths. In contrast, coherent multicarrier signals can be generated using an E/O converter that is similar to E/O converter 108 (FIG. 1), in which the optical subcarriers are generated from a single carrier wavelength by up-shifting from the baseband to that carrier wavelength the corresponding digitally generated electrical subcarriers. As a result, unlike conventional WDM and DWDM signals, coherent multicarrier signals have relatively stable optical phase difference(s) between adjacent (sub)carriers. This property causes the phase of the subcarrier interference to be deterministic, which enables relatively straightforward interference cancellation by way of proper digital signal processing and/or the use of guard bands between the adjacent subcarrier bands.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments may be implemented as circuit-based processes, including possible implementation on a single integrated circuit.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The description and drawings merely illustrate the principles of the disclosure. It will thus be appreciated that all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising an optical add-drop multiplexer configured to receive a first optical signal and to generate a second optical signal, each of the first and second optical signals being an optical orthogonal frequency-division multiplexed (OFDM) signal, wherein the optical add-drop multiplexer comprises a first receiver branch and a first transmitter branch;

wherein the first receiver branch is configured to:
apply a Fourier-transform operation to a first digital time-domain signal corresponding to the first optical signal to generate a first set of digital spectral components, each corresponding to a respective OFDM subcarrier;
transfer a first subset of the first set of digital spectral components to the first transmitter branch; and
process a second subset of the first set of digital spectral components to generate a first output data stream that carries data encoded in the second subset of the first set of digital spectral components;

wherein the first transmitter branch is configured to apply an inverse Fourier-transform operation to a second set of digital spectral components, each corresponding to a respective OFDM subcarrier, to generate a second digital time-domain signal, wherein the second set of digital spectral components includes the first subset of the first set of digital spectral components received from the first receiver branch;

wherein the optical add-drop multiplexer is further configured to use the second digital time-domain signal to generate the second optical signal in a manner that causes the second optical signal to carry data encoded in the first subset of the first set of digital spectral components;

wherein the optical add-drop multiplexer is configured to read one or more add-drop-through (ADT) indices from a header of a data frame carried by the first optical signal; and wherein the first receiver branch is configurable to sort the first set of digital spectral components into the first subset and the second subset thereof using the one or more ADT indices.

2. The apparatus of claim 1, wherein the optical add-drop multiplexer is configured to generate the second optical signal in a manner that causes the second optical signal not to carry the data encoded in the second subset of the first set of digital spectral components.

3. The apparatus of claim 1,
wherein the first transmitter branch is configured to:
receive a first input data stream; and
generate a third subset of digital spectral components having encoded thereon data carried by the first input data stream; and
wherein the second set of digital spectral components includes the third subset of digital spectral components.

4. The apparatus of claim 3, wherein the optical add-drop multiplexer is configured to generate the second optical signal in a manner that causes the second optical signal to also carry data encoded in the third subset of digital spectral components.

5. The apparatus of claim 3, wherein the second subset of the first set of digital spectral components and the third subset of digital spectral components have at least one OFDM subcarrier in common.

6. The apparatus of claim 3, wherein the first subset of the first set of digital spectral components and the third subset of digital spectral components have no OFDM subcarriers in common.

7. The apparatus of claim 3, wherein the second subset of the first set of digital spectral components and the third subset of digital spectral components have no OFDM subcarriers in common.

8. The apparatus of claim 3,
wherein the first transmitter branch is configurable to generate the third subset of digital spectral components using the one or more ADT indices.

9. The apparatus of claim 1, wherein the optical add-drop multiplexer further comprises a second receiver branch and a second transmitter branch;
wherein the second receiver branch is configured to:
apply a Fourier-transform operation to a third digital time-domain signal corresponding to the first optical signal to generate a third set of digital spectral components, each corresponding to a respective OFDM subcarrier;
transfer a third subset of the third set of digital spectral components to the second transmitter branch; and
process a fourth subset of the third set of digital spectral components to generate a second output data stream that carries data encoded in the fourth subset of the third set of digital spectral components;
wherein the second transmitter branch is configured to apply an inverse Fourier-transform operation to a fourth set of digital spectral components, each corresponding to a respective OFDM subcarrier, to generate a fourth digital time-domain signal, wherein the fourth set of digital spectral components includes the third subset of the third set of digital spectral components received from the second receiver branch;
wherein the optical add-drop multiplexer is further configured to use the fourth digital time-domain signal to generate the second optical signal in a manner that causes the second optical signal to carry data encoded in the third subset of the third set of digital spectral components;

wherein the first and third digital time-domain signals correspond to a first polarization and a second polarization, respectively, of the first optical signal; and
wherein the third and fourth digital time-domain signals correspond to the first polarization and the second polarization, respectively, of the second optical signal.

10. The apparatus of claim 9,
wherein the second transmitter branch is configured to:
receive a second input data stream; and
generate a fifth subset of digital spectral components having encoded thereon data carried by the second input data stream; and
wherein the fourth set of digital spectral components includes the fifth subset of digital spectral components.

11. The apparatus of claim 10, wherein the optical add-drop multiplexer is configured to generate the second optical signal in a manner that causes the second optical signal to also carry data encoded in the fifth subset of digital spectral components.

12. The apparatus of claim 9, wherein the optical add-drop multiplexer is configured to generate the second optical signal in a manner that causes the second optical signal not to carry the data encoded in the fourth subset of the third set of digital spectral components.

13. An apparatus comprising an optical add-drop multiplexer configured to receive a first optical signal and to generate a second optical signal, each of the first and second optical signals being an optical orthogonal frequency-division multiplexed (OFDM) signal, wherein the optical add-drop multiplexer comprises a first receiver branch and a first transmitter branch;
wherein the first receiver branch is configured to:
apply a Fourier-transform operation to a first digital time-domain signal corresponding to the first optical signal to generate a first set of digital spectral components, each corresponding to a respective OFDM subcarrier; and
transfer a first subset of the first set of digital spectral components to the first transmitter branch; and
wherein the first transmitter branch is configured to:
receive a first input data stream;
generate a second subset of digital spectral components having encoded thereon data carried by the first input data stream; and
apply an inverse Fourier-transform operation to a second set of digital spectral components, each corresponding to a respective OFDM subcarrier, to generate a second digital time-domain signal, wherein the second set of digital spectral components includes the first subset of the first set of digital spectral components received from the first receiver branch and the second subset of digital spectral components;
wherein the optical add-drop multiplexer is further configured to use the second digital time-domain signal to generate the second optical signal in a manner that causes the second optical signal to carry data encoded in the first subset of the first set of digital spectral components and in the second subset of digital spectral components;
wherein the optical add-drop multiplexer is configured to read one or more add-drop-through (ADT) indices from a header of a data frame carried by the first optical signal; and
wherein the first transmitter branch is configurable to generate the second subset of digital spectral components using the one or more ADT indices.

14. The apparatus of claim 13, wherein the first subset of the first set of digital spectral components and the second subset of digital spectral components have no OFDM subcarriers in common.

15. The apparatus of claim 13, wherein the first set of digital spectral components and the second subset of digital spectral components have at least one OFDM subcarrier in common.

16. The apparatus of claim 13, wherein the first set of digital spectral components and the second subset of digital spectral components have no OFDM subcarriers in common.

17. The apparatus of claim 13, wherein the first receiver branch is configurable to determine the first set of digital spectral components using the one or more ADT indices.

* * * * *